United States Patent
Chandrasekar

(10) Patent No.: US 12,314,400 B2
(45) Date of Patent: May 27, 2025

(54) SYSTEMS AND METHODS FOR VALIDATING THE ACCURACY OF AN AUTHENTICATED, END-TO-END, DIGITAL RESPONSE SYSTEM

(71) Applicant: Bank of America Corporation, Charlotte, NC (US)

(72) Inventor: Ganesh Chandrasekar, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 385 days.

(21) Appl. No.: 17/826,240

(22) Filed: May 27, 2022

(65) Prior Publication Data

US 2023/0385422 A1    Nov. 30, 2023

(51) Int. Cl.
*H04L 9/00*      (2022.01)
*G06F 21/31*     (2013.01)
*G06F 21/57*     (2013.01)

(52) U.S. Cl.
CPC .......... *G06F 21/577* (2013.01); *G06F 21/316* (2013.01)

(58) Field of Classification Search
CPC ............................. G06F 21/577; G06F 21/316
See application file for complete search history.

(56) References Cited

U.S. PATENT DOCUMENTS

| | | | |
|---|---|---|---|
| 2017/0359353 A1* | 12/2017 | Tan | G06F 16/122 |
| 2020/0228476 A1* | 7/2020 | Fejes | H04L 43/55 |
| 2020/0394469 A1* | 12/2020 | Kothuvatiparambil | G06F 40/279 |

OTHER PUBLICATIONS

Deep Learning in a Nutshell: Core Concepts (https://developer.nvidia.com/blog/deep-learning-nutshell-core-concepts) Published: Nov. 3, 2015 (Year: 2015).*

* cited by examiner

*Primary Examiner* — Syed M Ahsan
(74) *Attorney, Agent, or Firm* — Weiss & Arons LLP

(57) ABSTRACT

Systems and methods for validating the accuracy of an authenticated, end-to-end, digital response system are provided. Methods may include curating a database of training data, including historical profile data and historical interaction data. Profile data may include a name, an identifier, and a set of financial instruments for a plurality of system users. Interaction data may include records of multi-step interactions between the system users and the digital response system. Methods may include generating, via a machine-learning (ML) engine and based on the training data: a test profile including a fictitious name, a fictitious identifier, and a fictitious set of financial instruments; authentication data for the test profile including a username and password that are operational for authenticating the test profile to the digital response system; and a simulated conversation for the test profile including an utterance that is associated with an intended request. Methods may include: initiating a validation session by logging the test profile into the digital response system using the authentication data; feeding the simulated conversation as an input to the digital response system; receiving a response from the digital response system; scoring the accuracy of the response vis-à-vis the intended request; generating an accuracy report based on the accuracy score; and submitting the accuracy report to a system administrator.

16 Claims, 5 Drawing Sheets

SYSTEMS AND METHODS FOR VALIDATING THE ACCURACY OF AN AUTHENTICATED, END-TO-END, DIGITAL RESPONSE SYSTEM

FIELD OF TECHNOLOGY

Aspects of the disclosure relate to digital systems. Specifically, aspects of the disclosure relate to machine-learning (ML)-based optimization engines.

BACKGROUND OF THE DISCLOSURE

Digital response systems can have a tremendous impact on a company's efficiency. For example, a digital response system that is designed to respond to customer inquiries, such as typed and/or verbal inquiries, can provide an essential service on demand, without frustratingly long queues, and at a fraction of the cost it would take to train and employ humans in the same role.

However, to be effective, the digital response system must be associated with a level of accuracy that is high enough to satisfy a user interacting with the system. If a customer would call or chat with a customer service hotline and not receive an accurate response, the customer may leave very frustrated, and any potential advantage of the digital response system may be reduced or eliminated.

It would be desirable, therefore, to provide systems and methods for validating the accuracy of a digital response system. It would be further desirable to validate accuracy across the complete lifecycle of a customer interaction and across a wide array of customer interactions.

SUMMARY OF THE DISCLOSURE

Aspects of the disclosure relate to a systems and methods for validating the accuracy of an authenticated, end-to-end, digital response system. A validation platform may include a processor and a non-transitory memory. The platform may include a database of training data. The database may include historical profile data and historical interaction data. The profile data may include a name, an identifier, and a set of financial instruments for a plurality of system users. The interaction data may include records of multi-step interactions between the system users and the digital response system.

The platform may include a machine-learning (ML) engine configured to generate, based on the training data, a test profile. The test profile may include a fictitious name, a fictitious identifier, and a fictitious set of financial instruments.

The ML engine may also be configured to generate authentication data for the test profile. The authentication data may include a username and password that are operational for authenticating the test profile to the digital response system.

The ML engine may also be configured to generate a simulated conversation for the test profile. The simulated conversation may include an utterance that is associated with an intended request.

The platform may be configured to initiate a validation session by logging the test profile into the digital response system using the authentication data.

The platform may be configured to feed the simulated conversation as an input from the test profile to the digital response system during the validation session, receive a response from the digital response system, and score the accuracy of the response vis-à-vis the intended request.

The platform may also be configured to generate an accuracy report based on the accuracy score, and submit the accuracy report to a system administrator.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
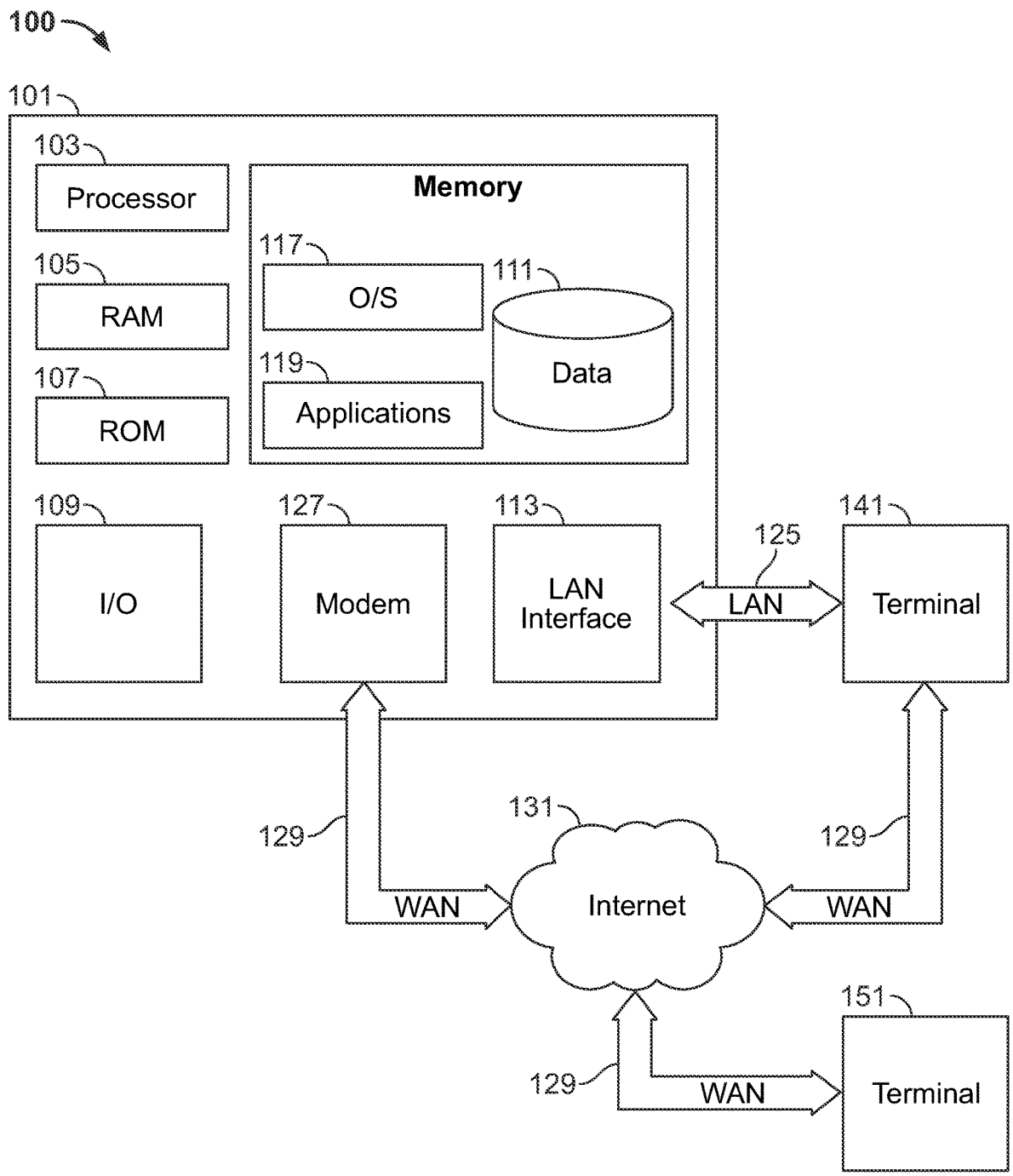
FIG. 1 shows an illustrative system in accordance with principles of the disclosure.

An end-to-end digital response system may refer to a computer system that supports a complete digital interaction lifecycle that may include receiving a request input, determining what the input is requesting, calculating what action satisfies the request, and executing the action. The interaction may also be a multi-step interaction, in which there may be a first input, a first response, and subsequent follow-up requests and responses, until the system may determine what is being requested and what action should be performed to satisfy the request. The digital response system may be authenticated, i.e., users that interact with and submit requests to the system may need to authenticate themselves to access the system. It may be advantageous to validate the accuracy of the responses of such digital response systems.

Aspects of the disclosure relate to a systems and methods for validating the accuracy of an authenticated, end-to-end, digital response system. A validation platform may include a processor and a non-transitory memory. The platform may include a database of training data. The database may include historical profile data and historical interaction data.

The profile data may include a name, an identifier, and a set of financial instruments for a plurality of system users. For example, the profile data for an example user profile for John Doe may include an identifier such as a social security number, or an internal identification number such as a unique customer number. The set of financial instruments may include various financial accounts, such as checking, savings, or investment accounts, or credit or debit cards.

The interaction data may include records of multi-step interactions between the system users and the digital response system. For example, the users may have previously made requests form the system. The requests may, for example, have been made in writing via a messaging service (e.g., a chat) of an online portal or a mobile application. The requests may also include verbal requests made to a computerized conversational assistant.

The platform may include a machine-learning (ML) engine configured to generate, based on the training data, a test profile. The test profile may include a fictitious name, a fictitious identifier, and a fictitious set of financial instruments. The test profile may be similar to a user profile except it does not represent a real person or a real account.

The ML engine may also be configured to generate authentication data for the test profile. The authentication data may include a username and password that are operational for authenticating the test profile to the digital response system.

The ML engine may also be configured to generate a simulated conversation for the test profile. The simulated conversation may include an utterance that is associated with an intended request.

The platform may be configured to initiate a validation session by logging the test profile into the digital response system using the authentication data. In certain embodiments, the platform may be further configured to override default system controls that verify the authenticity of user profiles when generating the test profile. Such default system controls may otherwise prevent the platform from logging the test profile into the system and verifying the accuracy of the responses.

The platform may be configured to feed the simulated conversation as an input from the test profile to the digital response system during the validation session. In some embodiments, the simulated conversation may be fed to the digital response system as a typed and/or verbal input.

The platform may be configured to receive a response from the digital response system, and score the accuracy of the response vis-à-vis the intended request. For example, the system may include a list of intended requests. The system may also include a list of possible responses. The system may also include a list of distance values between all the intended requests and all the possible responses. Shorter the distance value may be correlated with higher accuracy scores.

The platform may also be configured to generate an accuracy report based on the accuracy score, and submit the accuracy report to a system administrator.

In some embodiments, the platform may be further configured to automatically update the digital response system in response to an accuracy score that is below a predetermined threshold accuracy score. For example, when the accuracy score is below the threshold, and is thereby determined to be performing poorly, that may be indicative of a problem with the training data and/or with the computational algorithm of the digital response system. The platform may therefore update the training data and/or the computational algorithm of the digital response system to improve the performance and accuracy of the digital response system.

In certain embodiments the intended request may be one of a list of requests. The list of requests may include informational requests including requests for balance information and requests for status information, and/or transactional requests including requests to execute a transfer or a purchase.

In some embodiments, in response to an intended request that is a transactional request, the accuracy of the response may be scored in part based on whether the digital response system executed the requested transaction.

In certain embodiments, the platform may be further configured to generate at least one unique simulated conversation for each of the list of requests, and execute the feed, receive, and score for each of the unique simulated conversations. The platform may be configured to generate the accuracy report based on the aggregate scores of the unique simulated conversations.

In some embodiments, the feed, receive, and score for each of the unique simulated conversations may be executed in a separate validation session. Executing the validation testing for each simulated conversation separately may compartmentalize the responses, and prevent data leakage between the conversations.

In certain embodiments, the simulated conversation may be a multi-step conversation wherein the utterance is a first utterance and the response is a first response. The platform may be further configured to generate a set of follow-up utterances based on predicted system responses to the first utterance. At run-time, the platform may select a follow-up utterance from the set of follow-up utterances to feed to the digital response system in reply to the first response. The platform may receive, in response to the selected follow-up utterance, a second response from the digital response system, and the back-and-forth may proceed as many times as necessary until the conversation terminates. The platform may then score the response based on the first, second, and any other additional responses.

In some embodiments, the platform may be further configured to be operable to validate the accuracy of a plurality of different digital response systems. The platform may be system agnostic, and may be operable to validate any digital response system to which it is applied.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to interaction with and/or training of a digital response system. The input/output module may also include one or more speakers for providing audio output and a video display device for providing textual, audio, audio-visual, and/or graphical output. The input and output may be related to computer application functionality. The input and output may be related to interaction with and/or training of a digital response system.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to interaction with and/or training of a digital response system.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
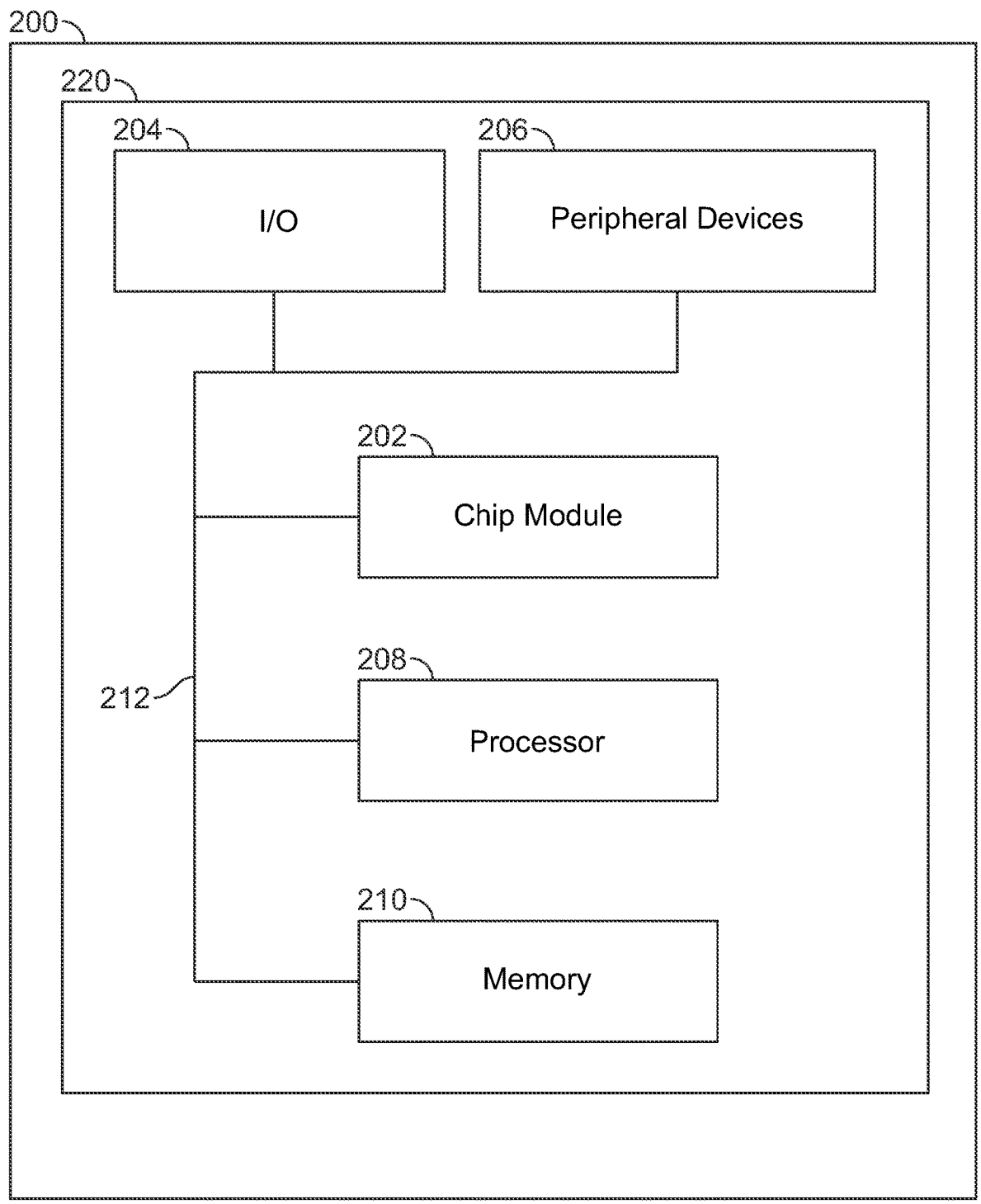
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
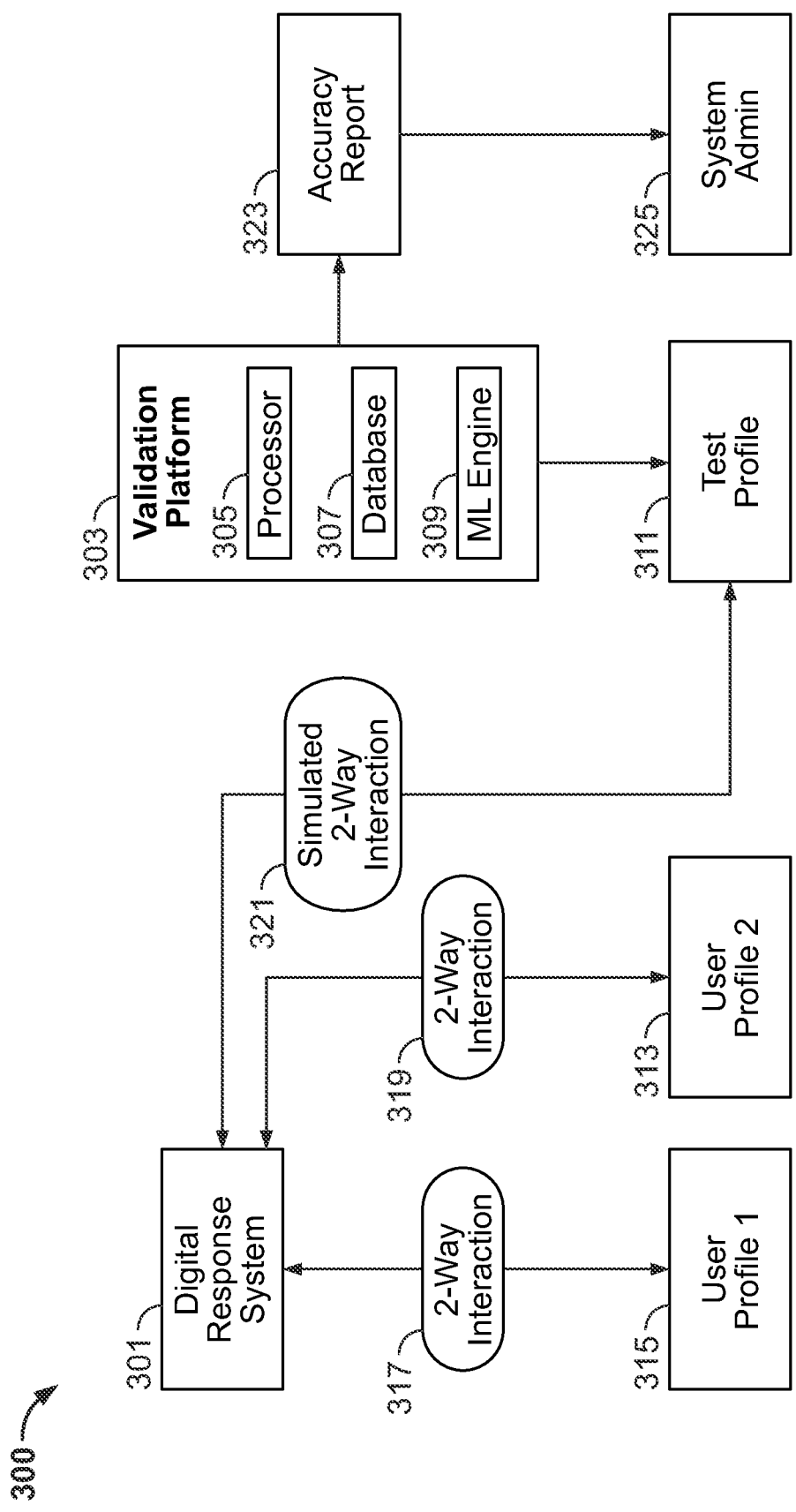
FIG. 3 shows an illustrative diagram in accordance with principles of the disclosure.

FIG. 3 shows illustrative diagram 300 in accordance with principles of the disclosure. Diagram 300 includes digital response system 301 and verification platform 303. Verification platform 303 may include processor 305, database 307, and machine-learning (ML) engine 309.

User profile 1 (315 and user profile 2 (313) may engage in 2-way interactions (317 and 319, respectively) with digital response system 301. Data from 2-way interactions 317 and 319 may be included in database 307 and may be used as training data for ML engine 309.

Validation platform 303 may generate test profile 311 and simulated 2-way interaction 321. Validation platform 303 may feed simulated 2-way interaction 321 to digital response system 301 and score the response(s). Based on the score, validation platform 303 may generate accuracy report 323 and may transmit the report to system administrator 325.

Figure 4:
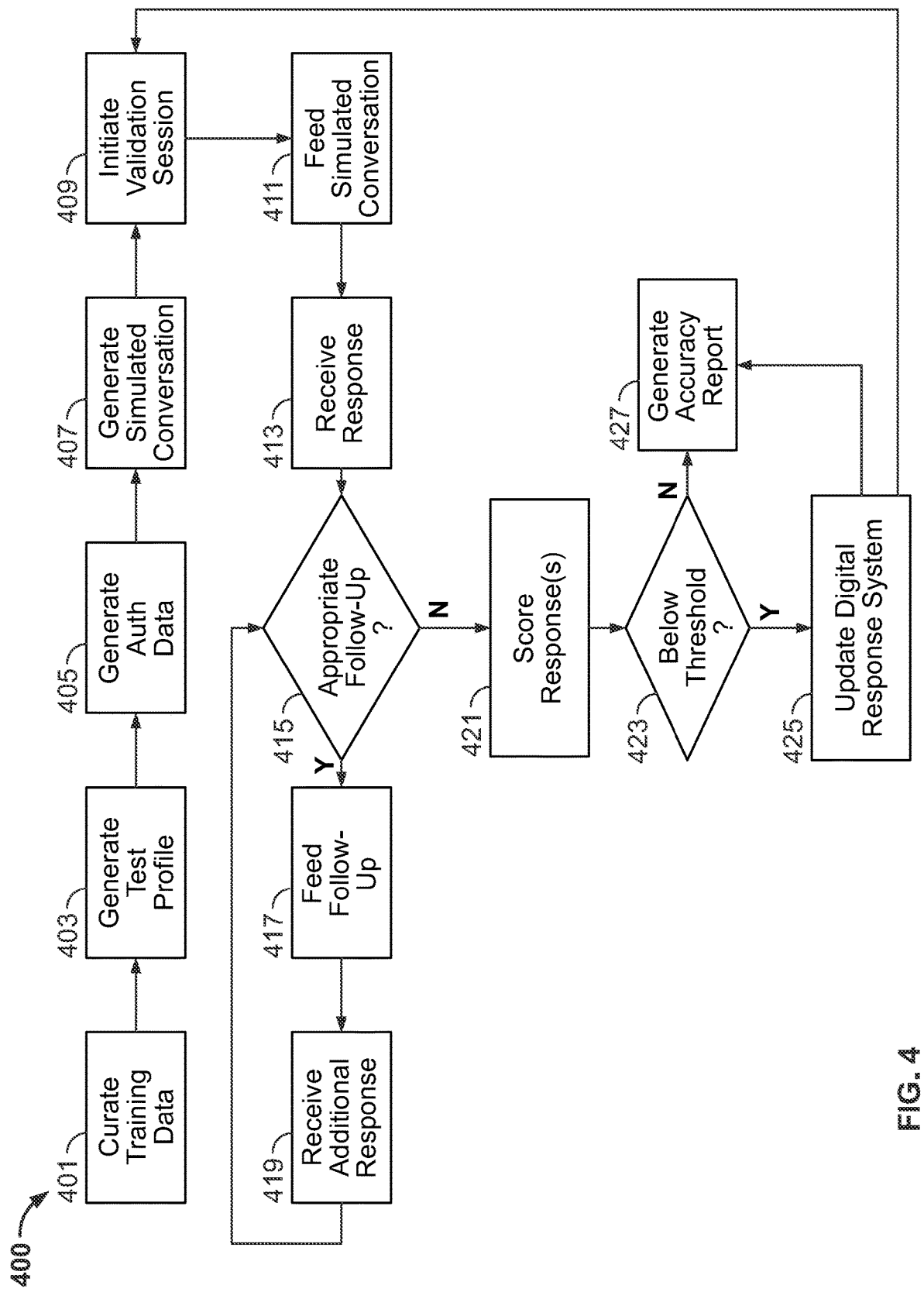
FIG. 4 shows an illustrative flowchart in accordance with principles of the disclosure.

FIG. 4 shows illustrative flowchart 400 of a process executed in accordance with principles of the disclosure. Flowchart 400 may begin at step 410 with curating training data for the validation platform. At step 403, the platform generates a test profile. At step 405, the platform generates authentication data for the test profile. At step 407, the platform generates a simulated conversation. At step 409 the platform initiates a validation session with a digital response system. At step 411, the platform feeds the simulated conversation to the digital response system. At step 413, the platform receives a response from the digital response system.

At step 415 the platform determines if a follow-up statement is appropriate based on the response. If a follow-up is appropriate, the platform generates or selects a follow-up and feeds the follow-up to the digital response system at 417. The platform then receives an additional response at 419, and proceeds to step 415 again to query if a follow-up statement is appropriate based on the response. This cycle may proceed any number of times until the platform determines that no follow-up is appropriate, at which time the platform scores the response(s) at step 421. At step 423 the platform queries whether the score is below a predetermined threshold. If the score is above the threshold, the platform generates a report at step 427 and the process may terminate. If the score is below the threshold, the platform may update the digital response system at step 425 (and may also generate an accuracy report at step 427). The platform may also start a new validation session at step 409 to validate whether the update was effective.

Figure 5:
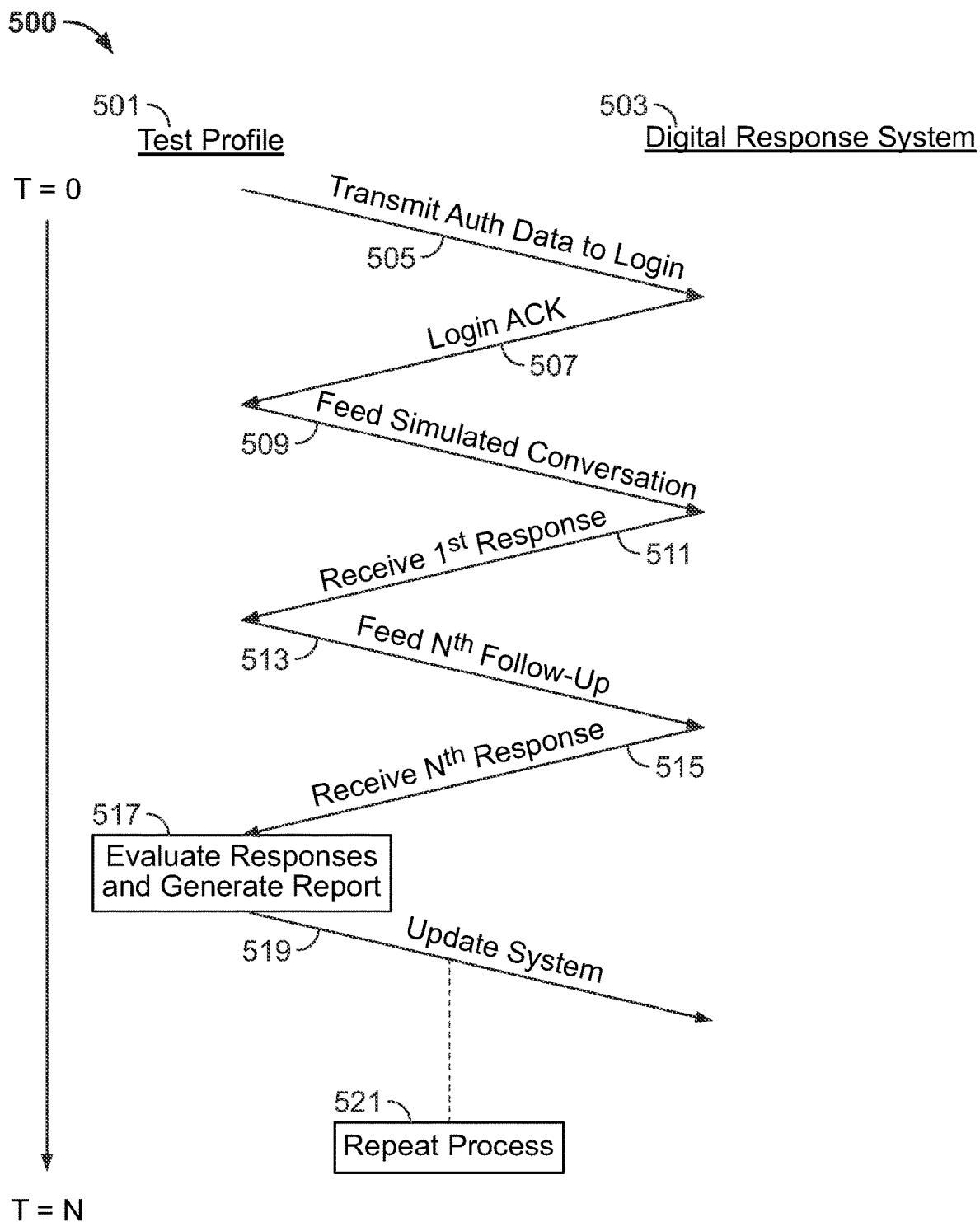
FIG. 5 shows an illustrative diagram in accordance with principles of the disclosure.

FIG. 5 shows illustrative diagram 500 in accordance with principles of the disclosure. Diagram 500 shows a series of transmissions between a validation platform running a test profile 501 and a digital response system 503, beginning at T=0 and proceeding until a later time T=N. At 505 the test profile may transmit authentication data to the digital response system to log in. When successful, the digital response system may transmit an ACK (acknowledgement message) to the test profile at 507. At 509 the test profile may transmit a simulated conversation to the digital response system. At 511 the test profile may receive a first response from the digital response system.

At 513 the test profile may transmit a follow-up message to the digital response system, and receive a response at 515. The back-and-forth may proceed multiple times until the conversation is over. At 517, the platform may evaluate the responses of the digital response system and generate a report. At 519 the platform may update the digital response system. At 521, the process may be repeated for other simulated conversations or to evaluate improvement for a previously tested conversation.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, systems and methods for validating the accuracy of an authenticated, end-to-end, digital response system are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for validating accuracy of an authenticated, end-to-end, digital response system, the method comprising:
  curating a database of training data, the database comprising:
    historical profile data, said profile data comprising a name, an identifier, and a set of financial instruments for a plurality of system users; and
    historical interaction data, said interaction data comprising records of multi-step interactions between the system users and the digital response system;
  generating, via a machine-learning (ML) engine and based on the training data:
    a test profile, said test profile comprising a fictitious name, a fictitious identifier, and a fictitious set of financial instruments;
    authentication data for the test profile, said authentication data comprising a username and password that are operational for authenticating the test profile to the digital response system; and
    a simulated conversation for the test profile, said simulated conversation comprising an utterance that is associated with an intended request;
  overriding default system controls that verify the authenticity of user profiles, such default system controls that would otherwise prevent logging the test profile into the digital response system;
  initiating a validation session by logging the test profile into the digital response system using the authentication data;
  feeding the simulated conversation as an input from the test profile to the digital response system during the validation session;
  receiving a response from the digital response system;
  scoring the accuracy of the response vis-a-vis the intended request;
  generating an accuracy report based on an accuracy score;
  submitting the accuracy report to a system administrator; and
  in response to the accuracy score that is below a predetermined threshold accuracy score, automatically updating training data and a computational algorithm of the digital response system to improve performance and accuracy of the digital response system.

2. The method of claim 1 wherein the simulated conversation is fed to the digital response system as a typed and/or verbal input.

3. The method of claim 1 wherein the intended request is one of a list of requests, said list of requests comprising:
informational requests comprising requests for balance information and requests for status information; and
transactional requests comprising requests to execute a transfer or a purchase.

4. The method of claim 3 wherein, in response to an intended request that is a transactional request, the accuracy of the response is scored in part based on whether the digital response system executed the requested transaction.

5. The method of claim 3 further comprising:
generating at least one unique simulated conversation for each of the list of requests;
executing the feeding, receiving, and scoring for each of the unique simulated conversations; and
generating the accuracy report based on the aggregate scores of the unique simulated conversations.

6. The method of claim 5 wherein the feeding, receiving, and scoring for each of the unique simulated conversations is executed in a separate validation session.

7. The method of claim 1 wherein:
the simulated conversation is a multi-step conversation wherein the utterance is a first utterance and the response is a first response; and
the method further comprises:
generating a set of follow-up utterances based on predicted system responses to the first utterance;
at run-time, selecting a follow-up utterance from the set of follow-up utterances to feed to the digital response system in reply to the first response;
receiving, in response to the selected follow-up utterance, a second response from the digital response system; and
scoring the response based on the first and the second responses.

8. The method of claim 1 wherein the method is operable to validate the accuracy of a plurality of different digital response systems.

9. A platform for validating accuracy of an authenticated, end-to-end, digital response system, the platform comprising:
a processor;
a memory;
a database of training data, the database comprising:
historical profile data, said profile data comprising a name, an identifier, and a set of financial instruments for a plurality of system users; and
historical interaction data, said interaction data comprising records of multi-step interactions between the system users and the digital response system; and
a machine-learning (ML) engine configured to generate, based on the training data:
a test profile, said test profile comprising a fictitious name, a fictitious identifier, and a fictitious set of financial instruments;
authentication data for the test profile, said authentication data comprising a username and password that are operational for authenticating the test profile to the digital response system; and
a simulated conversation for the test profile, said simulated conversation comprising an utterance that is associated with an intended request;
wherein the platform is configured to:
initiate a validation session by logging the test profile into the digital response system using the authentication data;
override default system controls that verify the authenticity of user profiles, such default system controls that would otherwise prevent logging the test profile into the digital response system;
feed the simulated conversation as an input from the test profile to the digital response system during the validation session;
receive a response from the digital response system;
score the accuracy of the response vis-a-vis the intended request;
generate an accuracy report based on an accuracy score;
submit the accuracy report to a system administrator; and
in response to the accuracy score that is below a predetermined threshold accuracy score, automatically update training data and a computational algorithm of the digital response system to improve performance and accuracy of the digital response system.

10. The platform of claim 9 wherein the simulated conversation is fed to the digital response system as a typed and/or verbal input.

11. The platform of claim 9 wherein the intended request is one of a list of requests, said list of requests comprising:
informational requests comprising requests for balance information and requests for status information; and
transactional requests comprising requests to execute a transfer or a purchase.

12. The platform of claim 11 wherein, in response to an intended request that is a transactional request, the accuracy of the response is scored in part based on whether the digital response system executed the requested transaction.

13. The platform of claim 11 further configured to:
generate at least one unique simulated conversation for each of the list of requests;
execute the feed, receive, and score for each of the unique simulated conversations; and
generate the accuracy report based on the aggregate scores of the unique simulated conversations.

14. The platform of claim 13 wherein the feed, receive, and score for each of the unique simulated conversations is executed in a separate validation session.

15. The platform of claim 9 wherein:
the simulated conversation is a multi-step conversation wherein the utterance is a first utterance and the response is a first response; and
the platform is further configured to:
generate a set of follow-up utterances based on predicted system responses to the first utterance;
at run-time, select a follow-up utterance from the set of follow-up utterances to feed to the digital response system in reply to the first response;
receive, in response to the selected follow-up utterance, a second response from the digital response system; and
score the response based on the first and the second responses.

16. The platform of claim 9 further configured to be operable to validate the accuracy of a plurality of different digital response systems.

\* \* \* \* \*